United States Patent [19]

Manes et al.

[11] Patent Number: 4,609,105
[45] Date of Patent: Sep. 2, 1986

[54] INFORMATION RECORDING DISK CARTRIDGE PROTECTIVE STRUCTURE

[75] Inventors: Kenneth Manes; Zahirudeen Premji; Edward White, all of Boulder County, Colo.

[73] Assignee: Storage Technology Partners II, Louisville, Colo.

[21] Appl. No.: 655,848

[22] Filed: Sep. 27, 1984

[51] Int. Cl.⁴ .............................................. B65D 85/00
[52] U.S. Cl. .................... 206/444; 206/309; 206/310; 360/133
[58] Field of Search ................ 206/1.5, 307, 309, 310, 206/311, 312, 313, 444, 456, 455, 387; 369/77.2, 272, 289, 291; 360/99, 133

[56] References Cited

U.S. PATENT DOCUMENTS

| | | | |
|---|---|---|---|
| 3,112,966 | 12/1963 | Reid | 206/309 |
| 3,169,023 | 2/1965 | Rivas | 369/291 |
| 3,360,271 | 12/1967 | George | 369/291 |
| 3,951,264 | 4/1976 | Heidecker et al. | 206/309 |
| 4,030,138 | 6/1977 | Hillier | 369/291 |
| 4,061,341 | 12/1977 | Kaplan | 369/291 |
| 4,159,494 | 6/1979 | Evans et al. | 206/444 |
| 4,164,782 | 8/1979 | Stewart | 206/444 |
| 4,191,292 | 3/1980 | Schweizer | 206/387 |
| 4,266,784 | 5/1981 | Torrington | 206/444 |
| 4,276,636 | 6/1981 | Morgan et al. | 369/291 |
| 4,278,258 | 7/1981 | Fujita et al. | 369/291 |
| 4,316,281 | 2/1982 | Prusak | 206/309 |
| 4,320,833 | 3/1982 | Antoniotti et al. | 206/309 |
| 4,327,830 | 5/1982 | Patel et al. | 206/309 |
| 4,379,507 | 4/1983 | Llabres | 206/444 |
| 4,399,913 | 8/1983 | Gelardi et al. | 206/387 |
| 4,428,483 | 1/1984 | Natrita et al. | 206/444 |
| 4,443,874 | 4/1984 | Steenberg | 206/312 |
| 4,463,849 | 8/1984 | Prusak et al. | 206/309 |
| 4,468,764 | 8/1984 | Fukumitsu | 369/77.2 |
| 4,476,978 | 10/1984 | Saito | 206/444 |
| 4,495,613 | 1/1985 | Gagnon | 369/289 |

FOREIGN PATENT DOCUMENTS

| | | | |
|---|---|---|---|
| 52257 | 9/1936 | Denmark | 369/291 |
| 241268 | 11/1911 | Fed. Rep. of Germany | 369/291 |

*Primary Examiner*—William Price
*Assistant Examiner*—David T. Fidei
*Attorney, Agent, or Firm*—Woodcock Washburn Kurtz Mackiewicz & Norris

[57] ABSTRACT

A protective cartridge assembly for protecting the sensitive recording surface of an information recording disk, said assembly being comprised of a cartridge housing having a pair of cartridge stand-offs attached to the inner upper surface of the cartridge housing, a cartridge tray for supporting the disk placed therein, and a disk spacer ring attached to the disk. The cartridge housing has an opening in its side in which the cartridge insert tray is slidably mounted. The cartridge housing has a protruding lip which cooperates with a recess in the exterior portion of the cartridge tray to sealably close the cartridge assembly thereby preventing contamination from entering the cartridge interior. The cartridge housing stand-offs and the disk spacer rings cooperate to prevent the disk recording surface from contacting the interior surface of the cartridge housing. Therefore, the cartridge assembly prevents exterior contamination from entering the cartridge thereby damaging the disk as well as preventing the disk from being damaged by inadvertent contact with the interior wall of the cartridge housing.

2 Claims, 7 Drawing Figures

INFORMATION RECORDING DISK CARTRIDGE PROTECTIVE STRUCTURE

BACKGROUND OF THE INVENTION

The disclosed invention relates to the field of high density information recording structures, and in particular to protection of the fragile recording surface of a disk-shaped information recording structure.

In high density information recording devices, information is recorded on a sensitive recording surface. The information is recorded on and read from the disk surface as the disk rotates at a high speed under either a magnetic or an optical head. In both high density recording devices, the extremely sensitive surface of both necessitate rigorous protection of the recording surface. In general, magnetic disks are coated with an ultra-thin, magnetically sensitive oxide layer. This layer is very susceptive to physical damage, as well as contamination from even the most minute of dust particles. Optical recording disks are coated with thin, light sensitive layers which react to exposure to high intensity light in order to create data marks. Optical disk recording surfaces are also extremly fragile and susceptible to physical damage.

In the early magnetic recording devices, the information recording disks were an integral, fixed, part of the storage device. However, in such a device having non-removable disks, the amount of information which can be stored in a given device is limited to the total storage capacity of the disks. To address this problem, in magnetic recording, devices using interchangeable media have been developed. However, when using interchangeable disks, particular care had to be taken to prevent physical damage and contamination of the disk when not loaded in the recording device. To provide this necessary protection, rigid and hermetically sealed magnetic disk packs have been provided. These disk packs usually include a spindle having the plurality of disks mounted thereto, a plurality of magnetic read-/write heads, and an actuator system, which radially moves the magnetic heads over the disk surface. In some magnetic recording devices, as many as eight permanently mounted disks have been placed upon a single spindle. Some disk packs even included two separate spindles, along with the associated hardware.

However, a severe deterrent to the use of such disk packs is the expense of including a complete set of spindles and actuators in each disk pack. A much cheaper approach is to have only the disk in a protective cartridge which is then loaded into the storage device. The problem is even more severe with optical media. Implementation in an optical system would require the interchange of an optical disk pack which would include all the necessary optical elements. Such would be prohibitably expensive.

One solution is the use of protective cartridges which only house the disk. The disk must then be loaded into the device for rotation by the permanently mounted device spindle. Protective cartridges which only contain the recording disk are well known for low density video and audio disks. Since information is recorded at a low density, such cartridges provide sufficient protection. However, more is needed to protect the surface of high density disks. While the presently developed cartridges can generally protect the disk from damage from exterior sources, the extremely sensitive nature of the recording surface can be damaged by contact with the interior surface of the disk cartridge itself. With low density audio and video recordings, this was not a particular problem. However, with the high density extremely sensitive recording surface of the magnetic and optical disks presently contemplated, contact between the recording disk surface and the interior walls of the cartridge itself can have a severe adverse impact on the performance of the disk.

What is needed then is a protective structure which not only contains the recording disk and protects that disk from exterior damage and contamination, but also protects the disk from being damaged as a result of contact with the interior surface of the protective structure itself.

It is an object of this invention to provide a means for preventing exterior damage to an information recording disk.

It is another object of the disclosed invention to provide a means for preventing contamination of the recording surface of an information recording disk.

It is yet another object of the disclosed invention to provide a means for preventing damage to the recording surface of an information recording disk while the disk is located in its protective cartridge.

BRIEF SUMMARY OF THE INVENTION

The disclosed invention, an information recording disk protective cartridge assembly, provides a means for protecting an information recording disk from damage and contamination from exterior sources, while also preventing damage to the disk surface as a result of contact between the recording disk surface and the interior walls of the protective cartridge. This is accomplished by completely enclosing the information recording disk in a protective cartridge and thereafter using stand offs and spacers to prevent the sensitive recording surface of the disk from coming in contact with the interior surface of the cartridge.

The invention is comprised of a cartridge housing having a set of stand-offs located on the interior upper wall of the cartridge, a cartridge tray for supporting the information recording disk, and a spacer concentrically attached to the upper surface of the information recording surface of the disk, such that the stand-off and spacer together cooperate to prevent the disk from contacting the cartridge interior walls.

In the preferred embodiment, the cartridge housing is a thin, rectangular shaped structure having an interior cavity and an opening on one end thereof for slidable retention of the cartridge insert tray. The disk rests in the cartridge insert tray on a recessed shoulder which supports the disk at the disks outer lower perimeter. The cartridge insert tray shoulder has a diameter which is substantially the same as the diameter of the information recording disk upon which the information recording disk can rest. In the preferred embodiment, the cartridge tray is slidably inserted into the cartridge housing through an opening in the side of the cartridge housing. The cartridge insert shoulder also has a raised rim which prevents the cartridge insert tray from displacement when fully inserted into the cartridge housing. In the preferred embodiment, the opening in the cartridge housing and the end of the insert which is located outside of the cartridge housing cooperate to sealably close the cartridge when the tray is fully inserted into the housing. This fully protects the disk from exterior damage and intrusion of contaminates into the housing.

In the preferred embodiment, stand-offs are attached to the interior surface of the cartridge housing and have a shape which matches the shape of the spacer attached to the disk surface. Thus, when the disk is fully inserted into the housing, the stand-offs and the spacer are aligned with respect to one another. In the preferred embodiment, the height of the spacer and the stand-offs are adjusted such that the disk can just barely pass into the cartridge housing. The close spacing between the stand-off and the spacer prevent the recording disk surface from contacting the interior walls of the cartridge.

In the preferred embodiment, the spacer is a ring shaped protrusion and the stand-offs are two circular arc-shaped protrusions. The circular shaped stand-offs are positioned to allow passage of a disk hub and cartridge insert tray locking mechanism past the stand-offs during disk insertion and removal from the cartridge housing.

DETAILED DESCRIPTION OF THE PREFERRED EMBODIMENT

Figure 1:
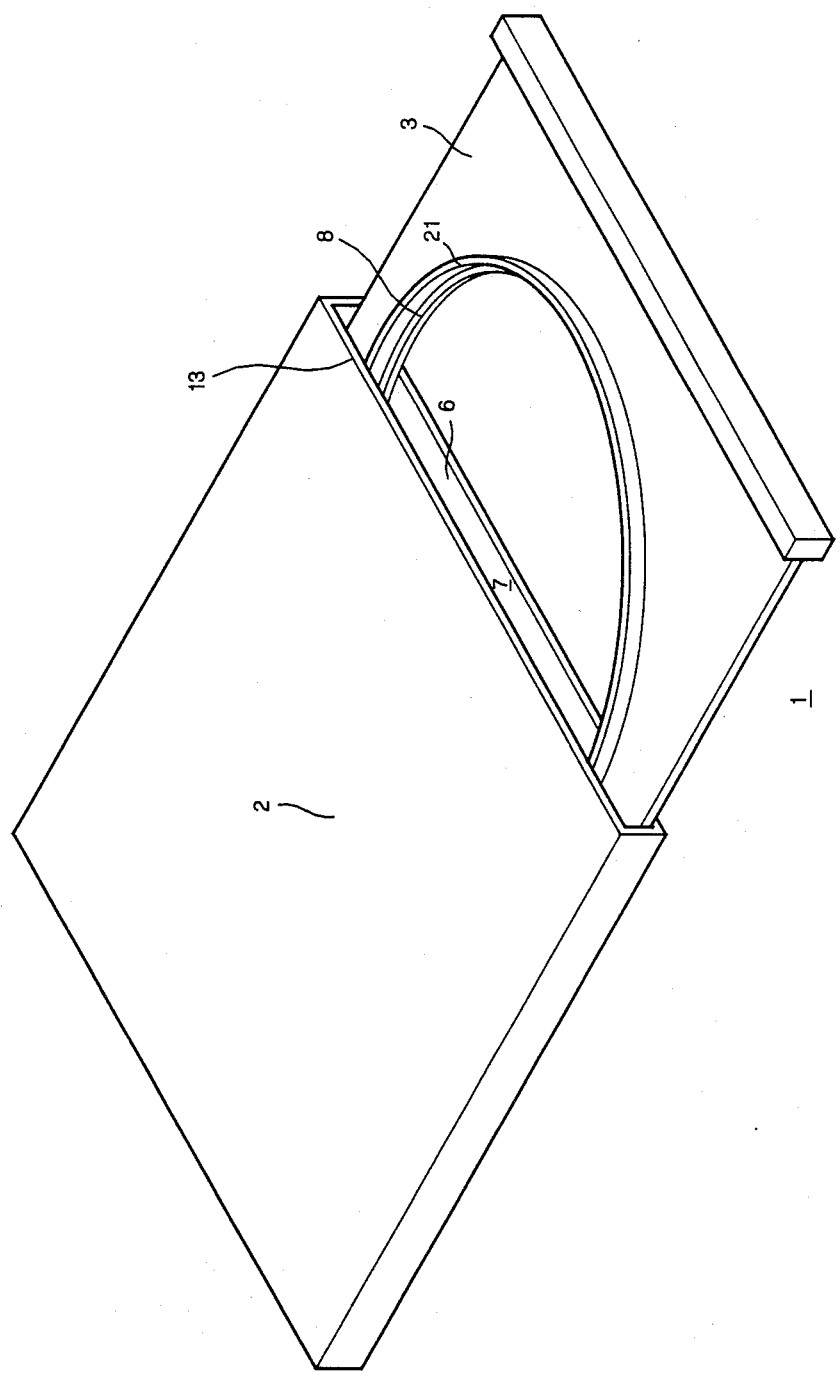
FIG. 1 is a pictorial representation of the disclosed invention showing a cartridge housing with the cartridge insert tray partially inserted therein.
Figure 5:
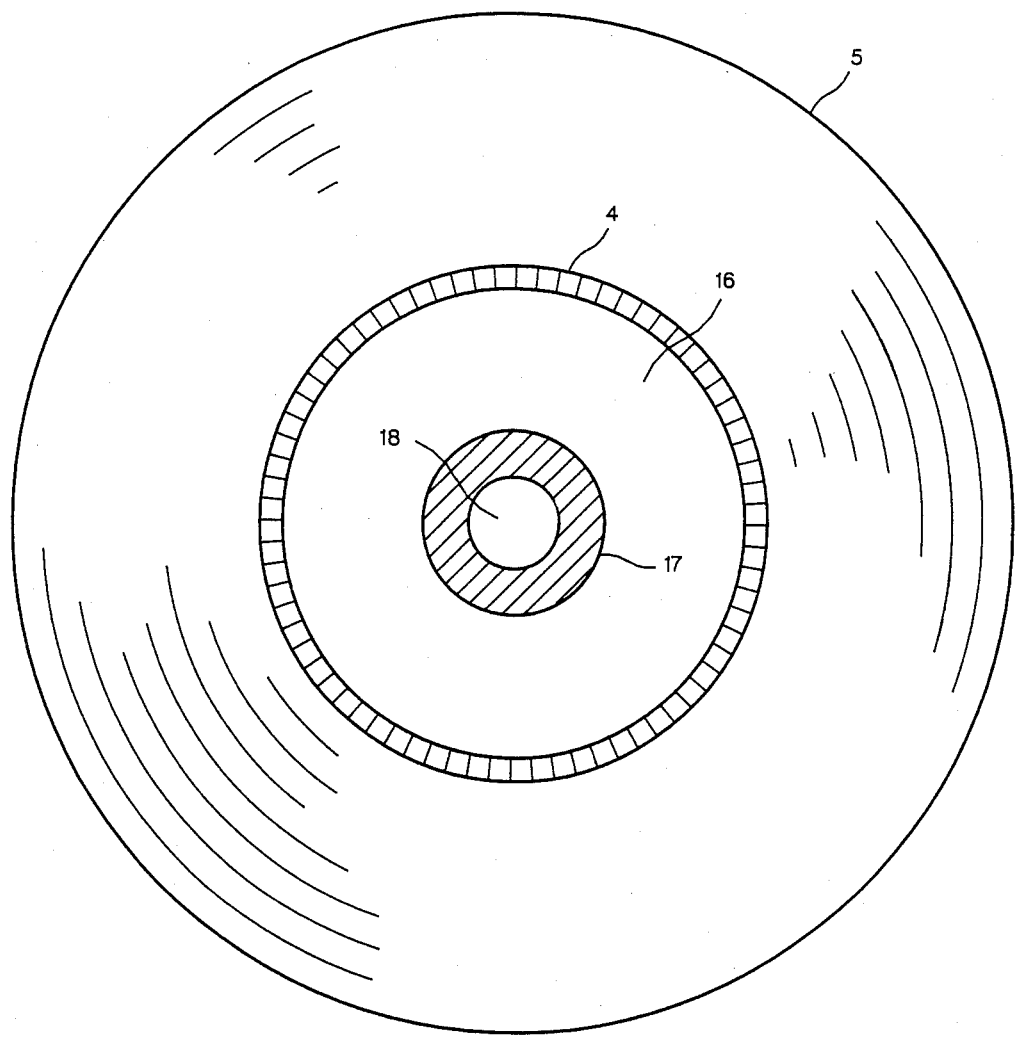
FIG. 5 is a top view of an information recording disk showing a spacer ring concentrically disposed on the upper surface of the disk also providing attachment for the flexible disk centering assembly.
Figure 6:
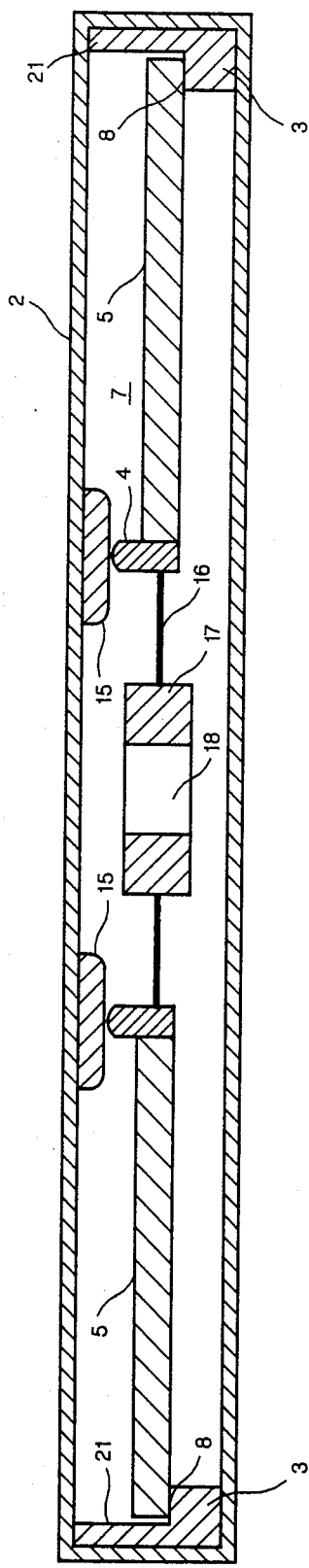
FIG. 6 is a side sectional view of the cartridge, taken along line B—B of FIG. 2, showing the disk resting on the cartridge insert tray and closely retained in place by the close cooperation between the cartridge stand-offs and the disk spacer ring.

As shown in FIGS. 1, 5 and 6, the disclosed invention, an information recording disk protective cartridge assembly 1, is comprised of a cartridge housing 2, a cartridge tray 3, and a spacer ring 4 concentrically mounted to the recording disk 5. In the preferred embodiment, the cartridge housing 2 is a rectangular shaped enclosure having a first opening 6, thereby defining a cavity 7 into which the cartridge tray 3 can be sealably and slidably inserted.

As shown in FIGS. 1 and 6, the cartridge tray 3 has a circular shoulder 8 upon which the recording disk 5 can rest when placed in the cartridge tray 3. As shown in FIG. 6, the shoulder 8 has a raised upper rim 21 which cooperates with the interior surface of the cartridge housing 2 to prevent transverse movement of the cartridge insert tray 3, within the cartridge housing 2.

Figure 2:
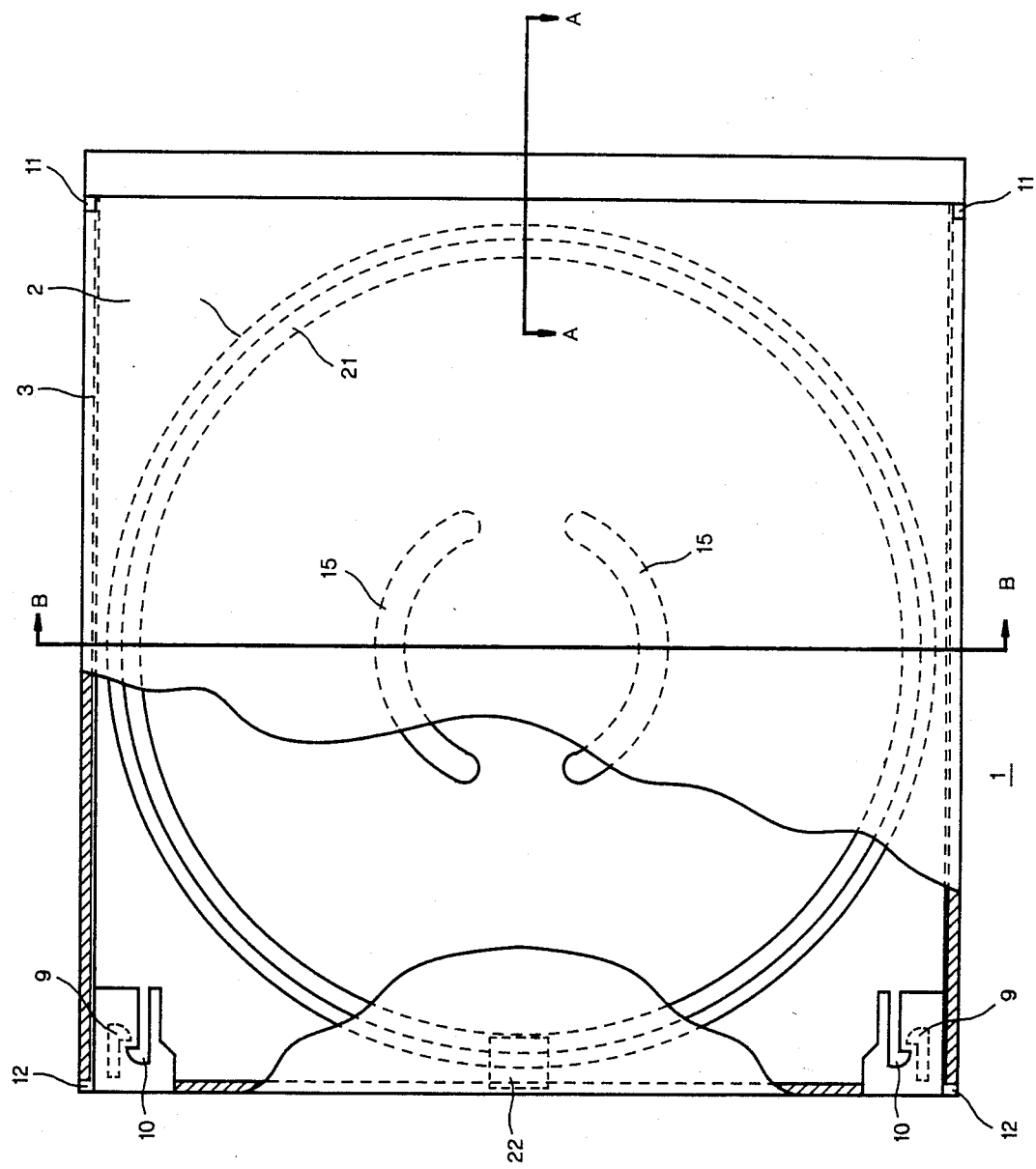
FIG. 2 is a top pictorial representation showing the cartridge housing and the cartridge insert tray, particularly pointing out the locking mechanism for locking the cartridge insert tray into the cartridge housing.
Figure 3:
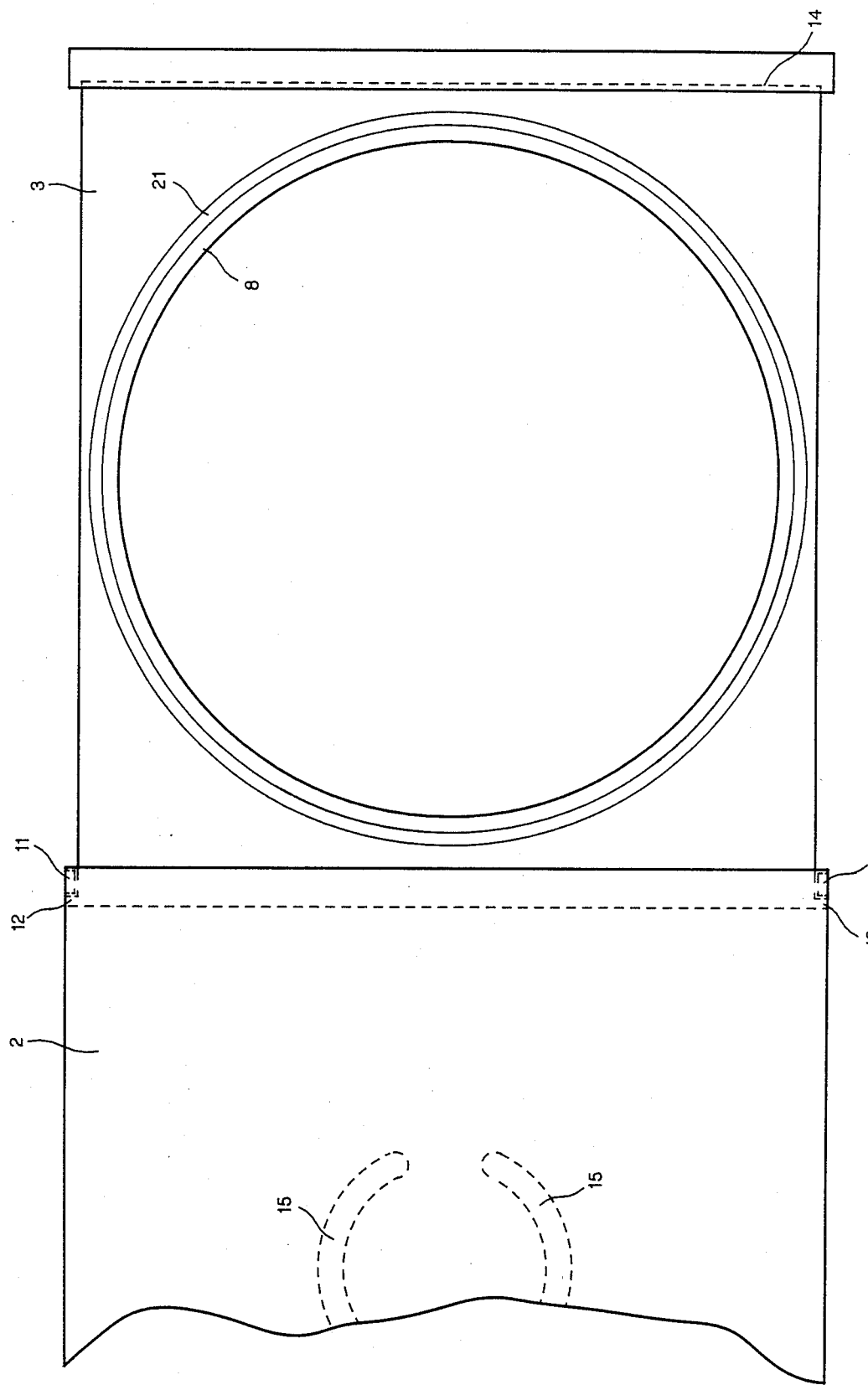
FIG. 3 is a top pictorial representation showing the cartridge insert tray fully extended from the cartridge housing.

As shown in FIG. 3, when the cartridge tray 3 is fully extended from the cartridge housing 2, a first pair of tabs 11 on the cartridge housing 2 cooperate with a second pair of insert tray tabs 12 on the interior end of the cartridge tray 3 to prevent the complete removal of the cartridge tray 3 from the cartridge housing 2. As shown in FIG. 2, when the cartridge tray 3 is fully inserted into the cartridge housing 2, the cartridge insert tray 3 is locked into the cartridge housing 2 by cooperation between a pair of housing notches 10 attached to the cartridge housing 2 and insert tray latches 9 attached to the interior end of the cartridge tray 3. This locks the cartridge tray 3 into the cartridge housing 2.

Figure 4:
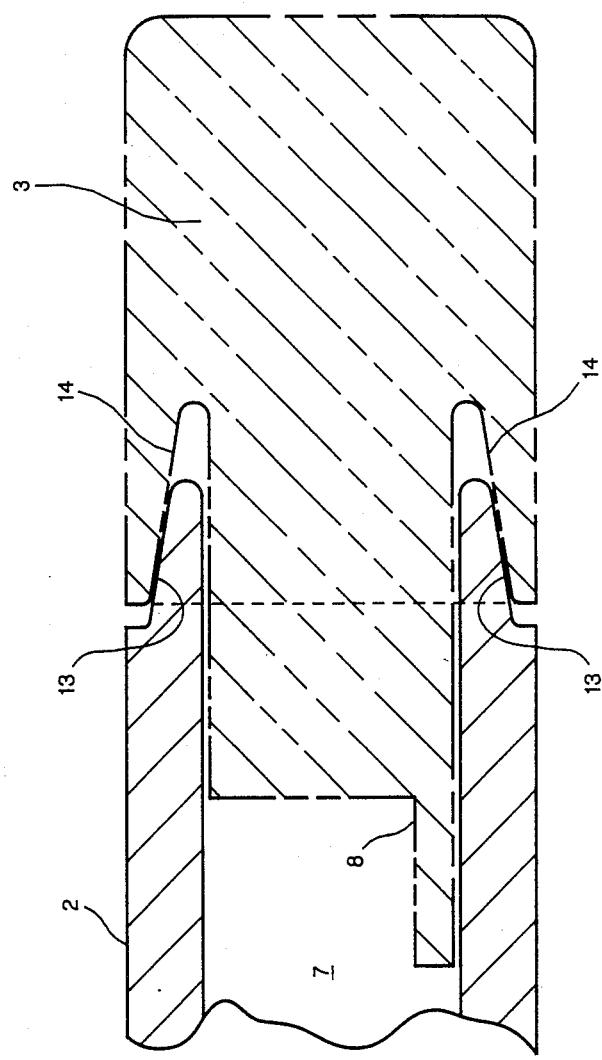
FIG. 4 is a sectional view showing the tapered sealing mechanism between the cartridge housing and the cartridge insert tray taken along the line A—A of FIG. 2.

As shown in FIG. 4, the cartridge opening 6 has a tapered protruding lip 13. Also, the cartridge insert tray 3 has a recess 14. When the cartridge insert tray 3 is fully inserted into the cartridge housing 2, the cartridge lip 13 slides into the insert tray recess 14 to sealably engage and sealably enclose the interior cavity 7 of the cartridge assembly 1 from the exterior environment. When the cartridge insert tray 3 is locked into the cartridge housing 2, the continuous contact between the housing lip 13 and the insert tray recess 14 provide a seal which prevents contamination from entering the cartridge cavity 7.

As shown in FIGS. 3 and 6, located on the upper inner surface of the cartridge housing 2 is a pair of downward protruding circular arc-shaped stand-offs 15. As shown in FIGS. 5 and 6, the recording disk 5 has a flexible disk centering assembly which is comprised of the ring shaped spacer 4, a flexure 16 and a centering collar 17. In the preferred embodiment, the disk 5 has a center opening, and the ring spacer 4 is attached to the edge of the opening in the disk 5. In turn, the flexure 16 has attached to it the inner edge of the spacer ring 4. The flexure 16 also has a centering opening into which is mounted the centering collar 17. In the preferred embodiment, the centering collar 17 has a hole 18 for mounting of the disk 5 to the device spindle (not shown). In the preferred embodiment, the flexure 16 allows the centering collar 17 to be displaced out of the plane of the disk 5 so that the disk 5 may be centered on the spindle prior to clamping of the disk 5 to the device spindle. For a more complete understanding of the flexible hub for this interchangeable disk, see co-pending U.S. Patent Application Ser. No. 499,667, filed May 31, 1983, entitled "FLEXIBLE HUB FOR REMOVABLE DISK" assigned to the same assignee as is the present invention.

As shown in FIG. 6, when the cartridge tray 3 having a disk 5 placed thereon is fully inserted into the cartridge housing 2, the ring shaped spacer 4 and the protruding stand-offs 15 operate to prevent the recording surface of the disk 5 from coming in contact with the inner surface of the cartridge housing 2. Also, as shown in FIG. 2, a protruding member 22, attached to the upper inner surface of the housing 2, prevents the interior portion of the disk 5 from riding forward and slipping out of the shoulder 8.

Figure 7:
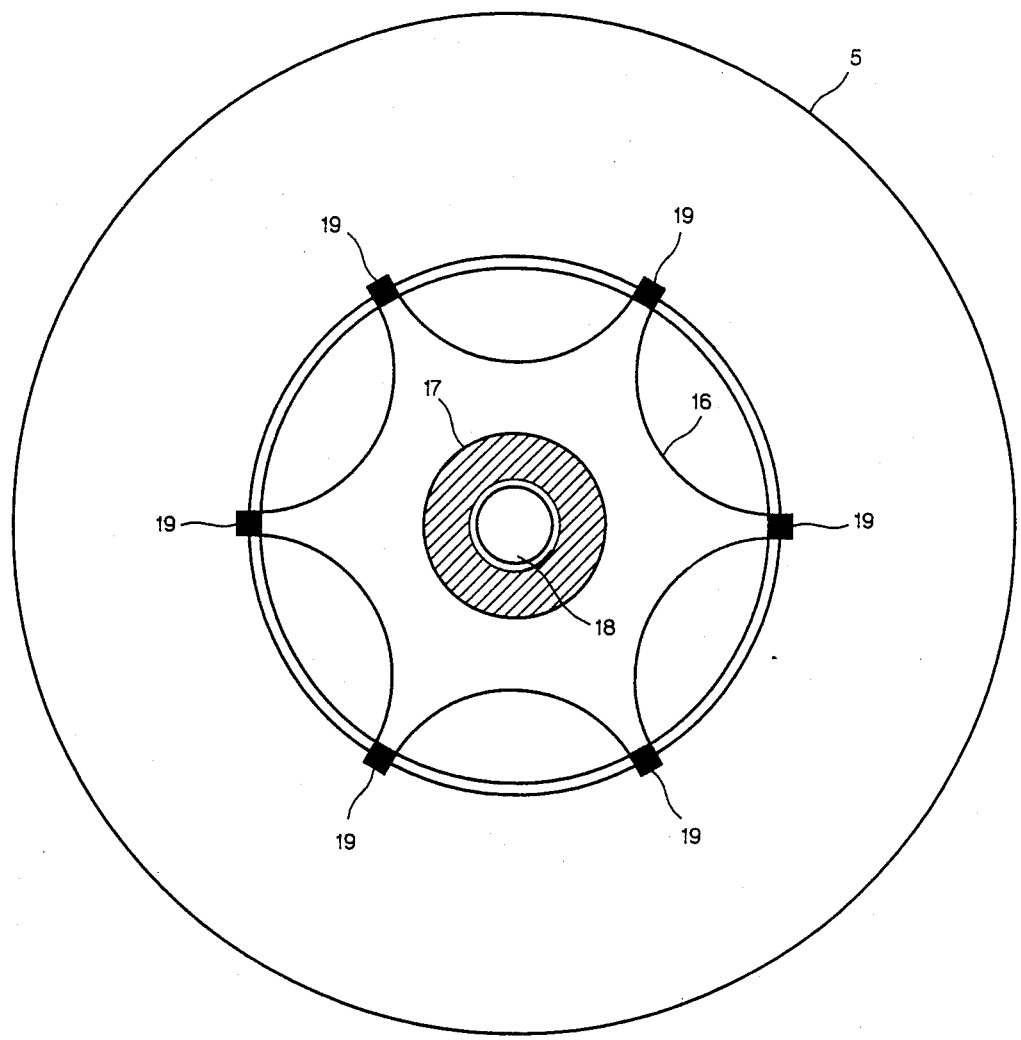
FIG. 7 shows an alternative embodiment wherein the continuous concentric spacer ring is replaced with a plurality of individually mounted spacer elements.

FIG. 7 shows an alternative embodiment of the disclosed invention wherein the spacer ring 4 is replaced by a plurality of individual spacer elements 19 with the flexure 16 attached to the individual spacer elements. The semi-circular shaped stand-offs 15 are to allow passage of the hub and the tray locking mechanism past the stand-offs 15 during disk 5 insertion and removal from the cartridge housing 2.

We claim:

1. An information recording disk protective cartridge assembly, said cartridge assembly comprising;
   a cartridge housing, said housing having a rectangular shape and having a rectangular opening on one side thereof, said cartridge housing further having a stand-off disposed on an inner surface thereof, and, also having a tapered protruding lip on the opening thereof;
   a cartridge insert tray, said cartridge insert tray being slidably disposed in the opening in the cartridge housing, said cartridge insert tray having a circular shoulder which supports a disk in the tray along the outer edge of the disk, said cartridge insert tray having a recess into which sealably mates the protruding cartridge housing lip to fully enclose the disk in the cartridge housing;
   a spacer attached to the disk, said spacer cooperating with the stand-off to prevent the disk from contacting the interior surface of the cartridge housing;
   means for preventing said cartridge insert tray from being completely removed from said cartridge housing; and
   means for locking said cartridge insert tray into said cartridge housing when said cartridge insert tray is in a closed position;
   wherein the spacer is attached to the edge of a center opening in the disk, said opening for the attachment of a flexible, disk centering assembly, said disk centering assembly in turn securely attached to the spacer, wherein the spacer is comprised of a raised ring shaped spacer which is completely attached to the edge of the disk opening, and wherein the stand-off is comprised of a pair of smooth, semicircular shaped protrusions having a diameter substantially the same as the ring shaped spacer and extending away from the inner cartridge surface a distance such that when the disk is fully inserted into the cartridge, the stand-off protrusions cooperate with the ring shaped spacer to prevent the disk recording surface from contacting the inner surface of the cartridge housing.

2. An information recording disk protective cartridge assembly, said cartridge assembly comprising:
   a cartridge housing, said housing having a rectangular shape and having a rectangular opening on one side thereof, said cartridge housing further having a stand-off disposed on an inner surface thereof, and, also having a tapered protruding lip on the opening thereof;
   a cartridge insert tray, said cartridge insert tray being slidably disposed in the opening in the cartridge housing, said cartridge insert tray having a circular shoulder which supports a disk in the tray along the outer edge of the disk, said cartridge insert tray having a recess into which sealably mates the protruding cartridge housing lip to fully enclose the disk in the cartridge housing;
   a spacer attached to the disk, said spacer cooperating with the stand-off to prevent the disk from contacting the interior surface of the cartridge housing;
   means for preventing said cartridge insert tray from being completely removed from said cartridge housing; and
   means for locking said cartridge insert tray into said cartridge housing when said cartridge insert tray is in a closed position;
   wherein the spacer is attached to the edge of a center opening in the disk, said opening for the attachment of a flexible, disk centering assembly, said disk centering assembly in turn securely attached to the spacer, and
   wherein the spacer is comprised of a plurality of spacer elements all equidistantly attached to the inner edge of the disk, the flexible, disk centering assembly in turn securely attached to each of the spacer elements.

* * * * *